United States Patent [19]

Nakagawa et al.

[11] Patent Number: 5,760,511
[45] Date of Patent: Jun. 2, 1998

[54] MAGNETIC BEARING CONTROLLER

[75] Inventors: Tohru Nakagawa; Isao Tashiro; Yoshihiro Ikemoto, all of Hirakata, Japan

[73] Assignee: Matsushita Electric Industrial Co., Ltd., Japan

[21] Appl. No.: 804,688

[22] Filed: Feb. 25, 1997

[30] Foreign Application Priority Data

Feb. 29, 1996 [JP] Japan .................................. 8-042570

[51] Int. Cl.$^6$ .................................................. G05B 5/01
[52] U.S. Cl. ..................... 310/90.5; 310/90.5; 318/611; 318/623; 318/632
[58] Field of Search .......................... 310/90.5; 318/632, 318/623, 611

[56] References Cited

U.S. PATENT DOCUMENTS

| | | | |
|---|---|---|---|
| 4,795,927 | 1/1989 | Morii et al. | 310/90.5 |
| 5,013,987 | 5/1991 | Wakui | 318/632 |
| 5,157,296 | 10/1992 | Trumper | 310/90.5 |
| 5,256,952 | 10/1993 | Yoneyama et al. | 318/629 |

FOREIGN PATENT DOCUMENTS

| | | | |
|---|---|---|---|
| 59-212519 | 12/1984 | Japan | 310/90.5 |
| 01-150015 | 6/1989 | Japan | 310/90.5 |
| 08-166019 | 6/1996 | Japan | 310/90.5 |

Primary Examiner—Thomas M. Dougherty
Assistant Examiner—K. Imayoshi Tamai
Attorney, Agent, or Firm—Parkhurst & Wendel

[57] ABSTRACT

A second circuit B which is composed of a band-pass filter circuit (5) which takes out a rotating body position signal input from a sensor (1) while scarcely varying a phase within a range including a normal rotation frequency and a reverse rotation frequency of a rotating body, a gain circuit (6) for controlling a gain of an output signal from the bandpass filter circuit (5) and a second notch filter circuit (7) for attenuating components having frequencies lower than the natural frequency of an output signal from a gain circuit (6) is disposed separately from a main circuit A, and an output signal from the second notch filter circuit (7) is positively fed back to the main circuit A through an adding circuit (8). This composition makes it possible to obtain a magnetic bearing which is capable of sufficiently attenuating a bending natural frequency of a high-speed rotating body and supporting this rotating body with high rigidity even when a normal rotation frequency and a reverse rotation frequency of the high-speed rotating body vary.

1 Claim, 5 Drawing Sheets

MAGNETIC BEARING CONTROLLER

FIELD OF THE INVENTION

The present invention relates to a magnetic bearing controller which controls a rotating body or a rotating shaft to a predetermined position by controlling an electric current supplied to an electromagnet used as a component of a magnetic bearing.

BACKGROUND OF THE INVENTION

A magnetic bearing system which supports a rotating body contactlessly in the air by utilizing magnetic attractions of electromagnets has characteristics that it is usable in vacuum, that it causes small bearing loss, that it requires no lubricant, that it produces low noise and that it is free from maintenance.

The known magnetic bearing system is composed, as disclosed by Japanese Patent Application Laid-Open No. 59-212519, of a cylindrical casing which is disposed outside a rotating body supported by the bearing system and has an axis aligned with a center axis of the rotating body, a radial bearing which is composed of stators functioning as electromagnets and electromagnetic attraction rotors which are disposed in opposition to each other on an inner circumferential surface of the casing and an outer circumferential surface of the rotating body so as to compose a bearing in a radial direction of electromagnetic attractions, and a thrust bearing which is composed of stators functioning as electromagnets and a disk-like thrust plate disposed on the inner circumferential surface of the casing and the outer circumferential surface of the rotating body so as to compose a bearing in a thrust direction of electromagnetic attractions. Disposed in the casing are a thrust sensor for detecting a position of the rotating body in its axial direction and a radial sensor for detecting a position of the rotating body in its radial direction.

The magnetic bearing system having the composition described above allows the rotating body to rotate while being kept at a constant position so as not to be brought into contact with the casing by controlling electric currents supplied to the stators of the radial bearing and the stators of the thrust bearing so as to control electromagnetic forces (electromagnetic attractions) of the stators composed of the electromagnets according to positions of the rotating body detected by the radial sensor and the thrust sensor.

The known magnetic bearing controller which controls the electric currents supplied to the electromagnets (stators) described above is composed, as disclosed by the above mentioned Japanese Patent Application Laid-Open No. 59-212519, of a first arithmetic section for controlling the magnetic bearings, a second arithmetic section for attenuating oscillations at a natural frequency of the rotating body, a first adding circuit for adding output signals from these arithmetic sections and a power amplifier circuit for supplying the electric currents to the electromagnets (stators) on the basis of an output signal from the first adding circuit.

The first arithmetic section mentioned above is composed of a phase compensator circuit for compensating phases of rotating body position signals detected by the sensors (hereinafter referred to as sensor signals), and a band-stop filter circuit for eliminating signals having frequencies within a predetermined frequency range including the natural frequency of the rotating shaft from an output signal of the phase compensator circuit and outputting a signal to the first adding circuit. The band-stop circuit has a gain which is nearly zeroed or set at a low level for components having the predetermined frequency range including the natural frequency of the rotating shaft.

The second arithmetic section mentioned above is composed of a band pass filter circuit which allows, contrary to the band-stop filter circuit, the signals having frequencies within the predetermined frequency range included in the sensor signals to pass, a gain controller for controlling gains of the sensor signals, a second adding circuit which adds the sensor signals having passed through the band pass filter circuit to the sensor signals having passed through the gain controller, a phase advancer circuit which advances a phase of an added signal from the second adding circuit so that the phase completely advances at least within the predetermined frequency range, and a notch filter which transforms an output signal from the phase advancer circuit so as to have more suitable gain and phase characteristics and outputs the signal to the first adding circuit.

Description will be made below of operations of the magnetic bearing controller which is composed as described above.

Positions of the rotating body which is controlled by the electromagnets to be controlled are detected by the sensors and the sensor signals are input into the first arithmetic section and the second arithmetic section.

In the first arithmetic section, phases of the sensor signals are compensated by the phase compensator circuit and signals having frequencies within the predetermined frequency range including the natural frequencies of the rotating shaft are eliminated, whereafter the sensor signals are sent to the first adding circuit.

In the second arithmetic section, the band-pass filter circuit allows, contrary to the band-stop filter circuit, sensor signals which have the frequencies within the predetermined frequency range to pass therethrough and these signals are added by the adding circuit to the sensor signals having passed through the gain controller, a phase of the added signal is advanced by the phase advancer circuit so that the phase advances completely at least within the predetermined frequency range, and the signal is transformed by the notch filter so as to have the more suitable gain and phase characteristics and sent to the first adding circuit.

An output signal from the first arithmetic section and an output signals from the second arithmetic section are added by the first adding circuit and output to the power amplifier circuit. On the basis of this output signal, the power amplifier circuit supplies electric currents to the electromagnets which are to be controlled.

The magnetic bearing controller which is composed as described above is used for machine tools such as a high-speed spindle, and configured as a circuit which attenuates a natural frequency of a rotating body and obtains high rigidity.

However, the composition of the known magnetic bearing controller described above possesses problems explained below.

Bending natural frequencies of the rotating body, or its normal rotation frequency and reverse rotation frequency vary dependently on its rotating speed. The bending natural frequency of the rotating body is varied when a rotating speed of a machine tool spindle is changed from a low level to a high level. In this case, the known magnetic bearing controller cannot provide a sufficient attenuation effect since it uses the band-pass filter circuit and the phase advancer circuit which are configured to sufficiently attenuate oscillations only at a definite natural frequency of the rotating body.

DISCLOSURE OF INVENTION

For solving the problem described above, a primary object of the present invention is to provide a magnetic bearing controller which sufficiently attenuates a bending natural frequency of a rotating body even when the bending natural frequency of the rotating body is varied.

For accomplishing this object, the controller according to the present invention is configured to control an electric current supplied to an electromagnet for setting a rotating body at a predetermined position according to a rotating body position detection signal detected with a sensor for detecting a position of the rotating body, and characterized in that it comprises a main circuit, a second circuit, an adding circuit for adding outputs from the main circuit and the second circuit, and a power amplifier circuit for supplying the electric current to the electromagnet on the basis of an output signal from the adding circuit, said main circuit being comprised of a first notch filter circuit which attenuates components having the natural frequency of the rotating body in the rotating body position detection signal, a deviation circuit which calculates a difference between an output signal from the first notch filter circuit and a position standard signal for the rotating body, and a phase compensator circuit which compensates a phase of a deviation signal calculated by the deviation circuit, and said second circuit being comprised of a band-pass filter circuit which takes out components having frequencies within a range including the normal rotation natural frequency and the reverse rotation natural frequency of the rotating body from the rotating body position detection signal and has a function to suppress phase advance and phase delay within the above-mentioned frequency range, a gain circuit for controlling a gain of an output signal from the band-pass filter circuit, and a second notch filter circuit for attenuating components having frequencies lower than the natural frequency of the rotating body in the signal having a gain controlled by the gain circuit.

The controller having the composition described above takes out a sensor signal from the band-pass filter while scarcely varying a phase within a predetermined frequency range including a normal rotation bending natural frequency and a reverse rotation bending natural frequency, and provides an output from the second circuit while nearly zeroing a gain by the second notch filter circuit at a definite frequency band lower than the natural frequency of the rotating body. By the way, it has already been found that oscillations of a rotating body at its natural frequency which are caused by external disturbance such as working can be suppressed by inputting a control signal inverted 180° in its phase into a power amplifier circuit. Therefore, it is possible, by positive feedback of the output signal of the second circuit to the output signal of the main circuit, to obtain an oscillation suppressing effect which allows the second circuit to maintain nearly constant phase and gain characteristics, thereby sufficiently attenuating a varied bending natural frequency even when the bending natural frequency is varied by the functions of the normal rotation and the reverse rotation.

Accordingly, the controller according to the present invention makes it possible to obtain a high rigidity magnetic bearing which is capable of sufficiently attenuating components having a natural frequency of the rotating body even when the natural frequency is varied within the frequency range including a normal rotation natural frequency and a reverse rotation frequency of the rotating body.

DESCRIPTION OF THE EMBODIMENT

Now, an embodiment of the magnetic bearing controller according to the present invention will be described with reference to the accompanying drawings.

Figure 1:
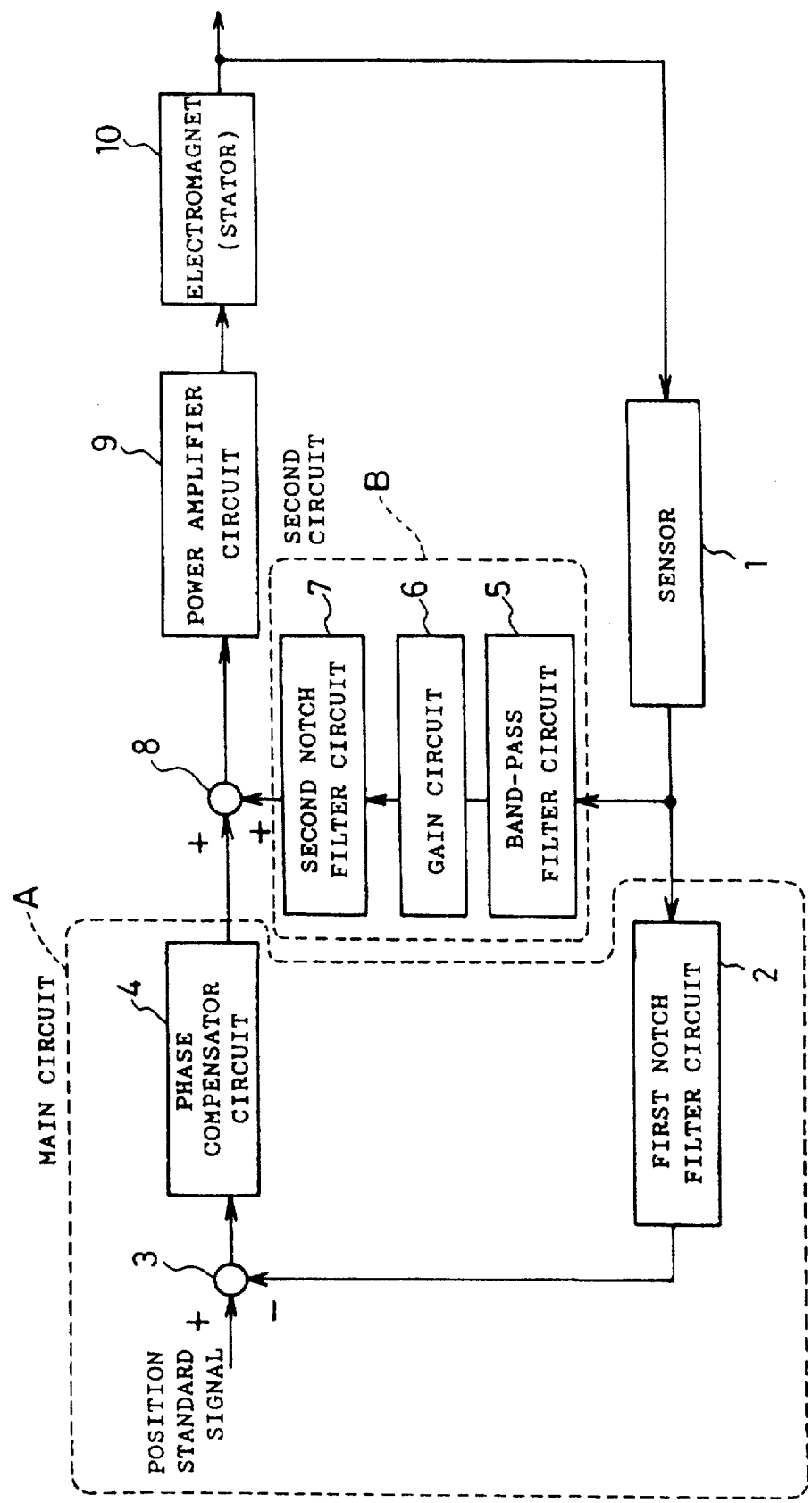
FIG. 1 is a block diagram illustrating a circuit configuration of an embodiment of the magnetic bearing controller according to the present invention.

FIG. 1 is a block diagram illustrating a circuit configuration of the magnetic bearing controller according to the present invention. As shown in this drawing, the magnetic bearing controller is composed of a main circuit A which has a general role for controlling a magnetic bearing using a rotating body position detection signal (hereinafter referred to as a sensor signal) detected by a sensor 1 as an input signal, a second circuit B which also uses the sensor signal as an input signal, an adding circuit 8 which adds output signals from the main circuit A and the second circuit B, and a power amplifier circuit 9 which supplies an electric current to an electromagnet (stator) 10 to be controlled on the basis of an output signal from the adding circuit 8.

The main circuit A is composed of a first notch filter circuit 2 which attenuates components having a natural frequency of a rotating body in the sensor signal, a deviation circuit 3 which calculates a difference between an output signal from the first notch filter circuit 2 and a position standard signal for the rotating body, and a phase compensator circuit 4 which compensates a phase of a deviation signal calculated by the deviation circuit 3 and outputs the signal to the adding circuit 8.

The second circuit B is composed of a band-pass filter circuit 5 which takes out components having frequencies within a range including a normal rotation frequency and a reverse rotation frequency of the rotating body from the sensor signal, and has a function to suppress phase advance and phase delay within the above-mentioned frequency range, a gain circuit 6 which controls a gain of an output signal from the band-pass filter circuit 5, and a second notch filter circuit 7 which attenuates components having frequencies lower than the natural frequency of the rotating body in the output signal subjected to the gain control by the gain circuit 6 and outputs the signal to the adding circuit 8.

Figure 2:
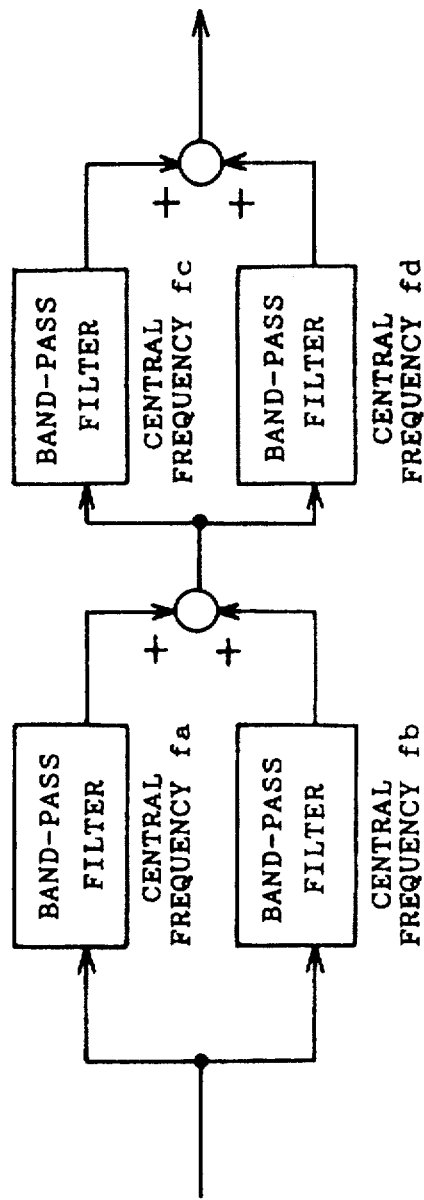
FIG. 2 is a block diagram exemplifying a configuration of a band-pass filter circuit of the magnetic bearing controller shown in FIG. 1.
Figure 3A:
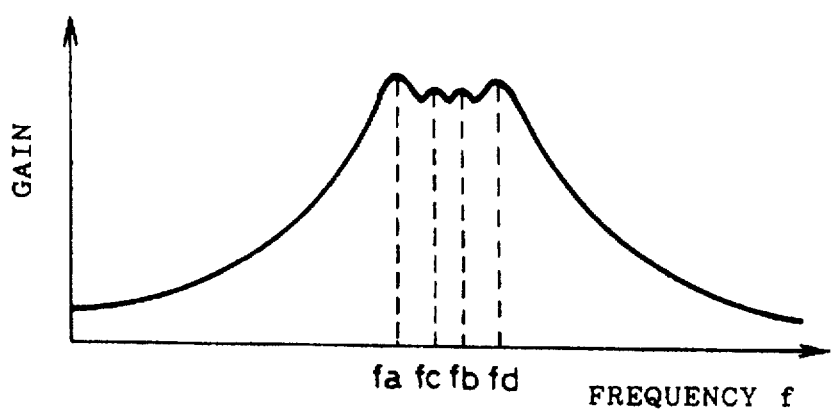
FIGS. 3(a) and 3(b) are graphs illustrating a gain characteristic and a phase characteristic of the band-pass filter circuit of the magnetic bearing controller shown in FIG. 1.
Figure 3B:
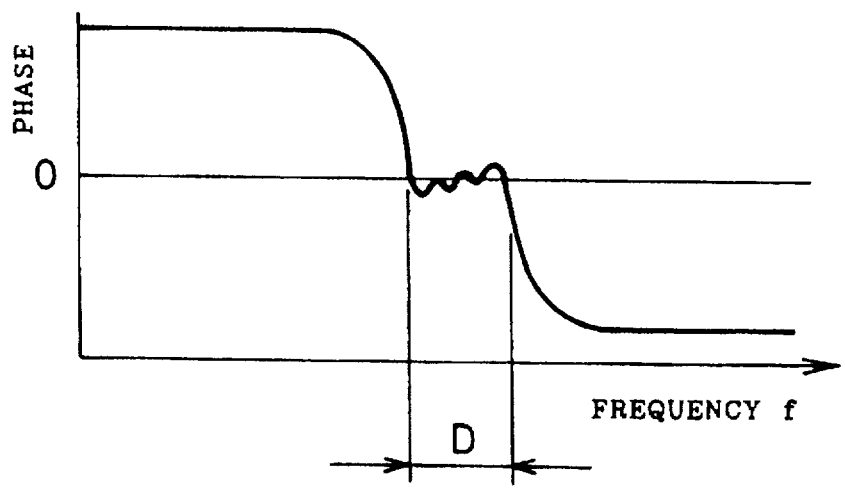

The band-pass filter circuit 5 of the second circuit B is composed by combining four band-pass filters having different central frequencies (central frequencies fa, fb, fc and fd), for example, as shown in FIG. 2, and has a gain characteristic and a phase characteristic illustrated in FIGS. 3(a) and 3(b). The gain characteristic and the phase characteristic of the band-pass filter 5 can be maintained nearly constant within a frequency range D shown in these drawings. The frequency range D can easily be selected so as to include the normal rotation frequency and the reverse rotation frequency of the rotating body.

Now, description will be made of operations of the magnetic bearing controller which has the composition explained above.

A position of the rotating body controlled by the electromagnet 10 which is to be controlled by the controller is detected by the sensor 1 and the sensor signal is input into the main circuit A and the second circuit B.

The sensor signal which is input into the main circuit A is attenuated within the frequency range including the normal rotation frequency and the reverse rotation frequency of the rotating body and fed back to the deviation circuit 3. The deviation circuit 3 calculates a difference between a position standard signal for the rotating body and the output signal from the first notch filter circuit 2, and inputs a calculated deviation signal into the phase compensator circuit 4. The phase deviation circuit 4 compensates a phase of the deviation signal by proportional calculation, integral calculation, differential calculation, etc. and outputs the signal to the adding circuit 8.

Figure 4A:
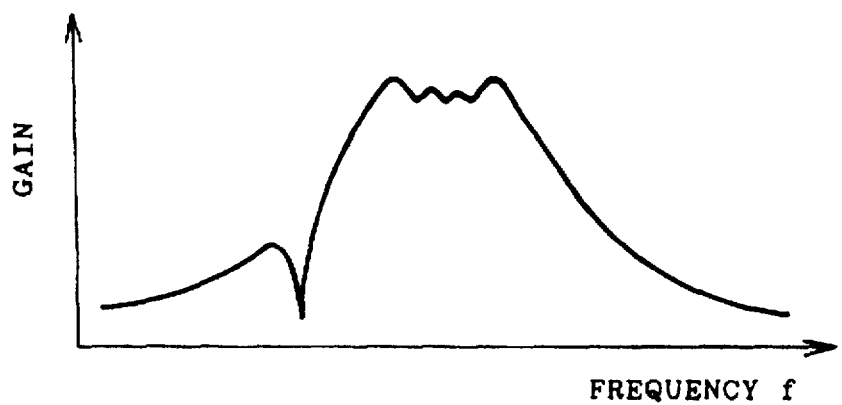
FIGS. 4(a) and 4(b) are graphs illustrating a gain characteristic and a phase characteristic of the second circuit of the magnetic bearing controller shown in FIG. 1.
Figure 4B:
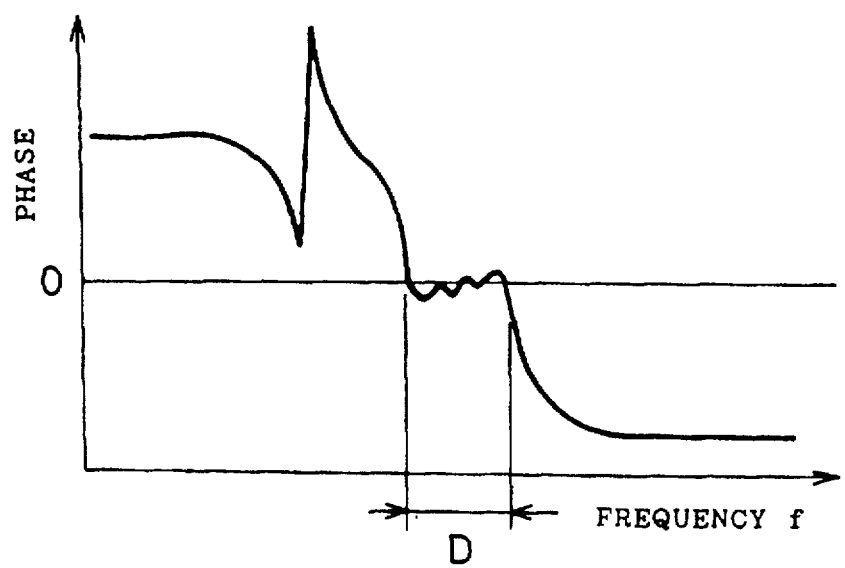

From the sensor signal which is input into the second circuit B, the band-pass filter circuit 5 takes out components having the frequencies within the range including the normal rotation frequency and the reverse rotation natural frequency of the rotating body. The band-pass filter circuit 5 is configured so as to scarcely vary a phase within this frequency range, or can maintain a nearly constant gain characteristic and a nearly constant phase characteristic within this frequency range. The frequency component signals taken out by the band-pass filter circuit 5 are subjected to gain control by the gain circuit 6 and input into the second notch filter circuit 7. The second notch filter circuit 7 lowers a gain characteristic at frequencies lower than the natural frequency of the rotating body and outputs the signals to the adding circuit 8. A gain characteristic and a phase characteristic of the second circuit B are shown in FIGS. 4(a) and 4(b).

Output signals from the main circuit A and the second circuit B are added by the adding circuit 8 and output to the power amplifier circuit 9. On the basis of the addition signal, the power amplifier circuit 9 supplies an electric current to the electromagnet 10 which is to be controlled.

The magnetic bearing controller according to the present invention which is configured to perform the positive feedback of the components having the natural frequency of the rotating body and allowed to pass through the second circuit B may seem to have a function to amplify the components having the natural frequency. When the position standard signal is modified into a sinusoidal wave signal by operating only the main circuit A with the second circuit B kept inoperative, however, the rotating body is oscillated at its natural frequency, but the phases of the input signal to the power amplifier circuit 9 and the output signal from the sensor 1 are completely inverted. In other words, the rotating body is resonated with the sinusoidal signal. It is therefore necessary to perform the positive feedback of the signals from the second circuit B of the present invention for suppressing the vibration of the components having the natural frequency of the rotating body. By composing a circuit of a magnetic bearing controller as described above, it is possible to obtain a sufficient attenuating effect even when a bending natural frequency of a rotating body is varied to a normal rotation frequency or a reverse rotation frequency.

Now, a concrete experimental example of the present invention will be described below.

Actual end mill working was carried out by applying the magnetic bearing controller according to the present invention to a high-speed magnetic bearing spindle for machine tools (rotational frequency: 3000 rpm, natural frequency of rotating body: 1.07 kHz).

When the magnetic bearing controller according to the present invention was not used, high-frequency oscillations were caused and a nature of a worked surface was degraded as working load was increased by enlarging working cut.

The high-frequency oscillations were oscillations of a rotating body at its natural frequency which were causes due to working external disturbance.

Figure 5A:
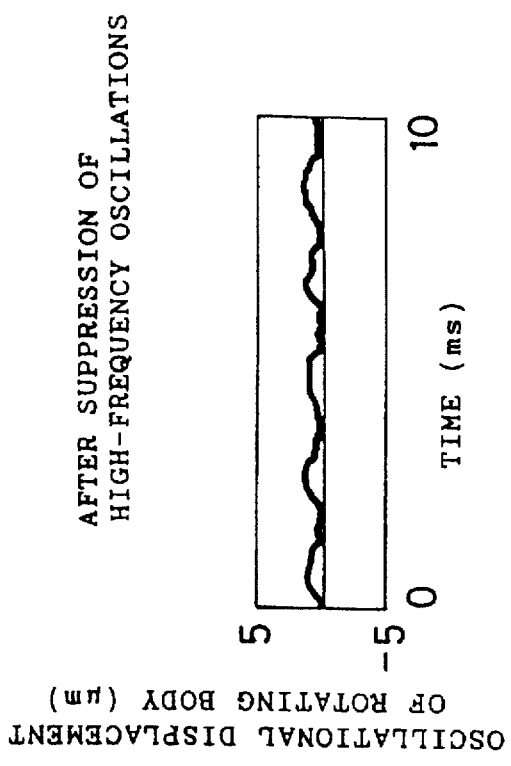
FIGS. 5(a) and 5(b) are graphs illustrating oscillations of a rotating body in disposed in the magnetic bearing controller shown in FIG. 1.

Observation results of the oscillated condition of the rotating body are shown in FIG. 5(a).

Figure 5B:
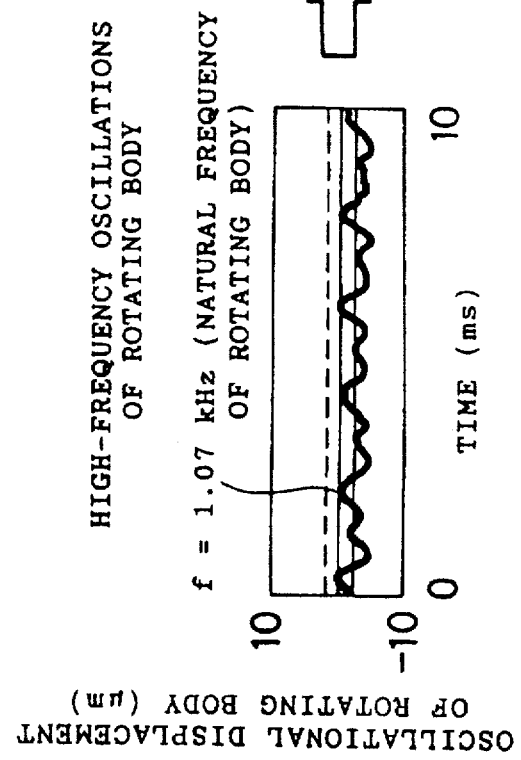

Results obtained by applying the magnetic bearing controller according to the present invention to working in the same conditions are shown in FIG. 5(b), wherein the oscillations at the natural frequency of 1.07 kHz of the rotating body are not observed, leaving only vibration (500 Hz, 2 μm P-P) which was caused due to unbalance of the rotating body. A nature of a worked surface was not degraded by the wearing with the magnetic bearing controller according to the present invention.

As understood from the foregoing description, the magnetic bearing controller according to the present invention makes it possible to obtain a magnetic bearing which is capable of supporting a rotating body with high rigidity by sufficiently attenuating oscillations at a natural frequency of the rotating body even when the natural frequency of the rotating body varies within a range including a normal rotation frequency and a reverse rotation frequency of the rotating body.

What is claimed is:

1. A controller for controlling an electric currents supplied to an electromagnet for setting a rotating body at a predetermined position according to a rotating body position detection signal detected by a sensor for detecting a position of said rotating body, said controller comprising:
   a main circuit;
   a second circuit;
   an adding circuit which adds output signals from said main circuit and said second circuit; and
   a power amplifier circuit for supplying electric currents to said electromagnet on the basis of output signals from said adding circuit;
   said main circuit comprising:
      a first notch filter circuit for attenuating components having natural frequency of said rotating body in said rotating body position detection signal,
      a deviation circuit for calculating a difference between an output signal from said first notch filter circuit and a position standard signal for said rotating body, and
      a phase compensator circuit for compensating a phase of a deviation signal calculated by said deviation circuit; and
   said second circuit comprising:
      a band-pass filter circuit which has a function to take out components having frequencies within a range including a normal rotation frequency and a reverse rotation frequency of said rotating body from said rotating body position detecting signal, and another function to suppress phase advance and phase delay within said frequency range,
      a gain circuit for controlling a gain of an output signal from said band-pass filter circuit, and
      a second notch filter circuit for attenuating components having frequencies lower than the natural frequency of said rotating body in a signal having a gain controlled by said gain circuit.

* * * * *